(12) United States Patent
Gaba

(10) Patent No.: US 12,110,901 B2
(45) Date of Patent: Oct. 8, 2024

(54) PUMP BEARING RETAINER

(71) Applicant: GRUNDFOS HOLDING A/S, Bjerringbro (DK)

(72) Inventor: Gunnar Gaba, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 699 days.

(21) Appl. No.: 17/148,778

(22) Filed: Jan. 14, 2021

(65) Prior Publication Data

US 2021/0222699 A1  Jul. 22, 2021

(30) Foreign Application Priority Data

Jan. 17, 2020 (EP) .................................. 20152543

(51) Int. Cl.
| | |
|---|---|
| *F04D 29/02* | (2006.01) |
| *F04D 13/06* | (2006.01) |
| *F04D 29/046* | (2006.01) |
| *F04D 29/047* | (2006.01) |
| *F04D 29/06* | (2006.01) |
| *F04D 29/58* | (2006.01) |
| *F04D 29/62* | (2006.01) |
| *F16C 33/76* | (2006.01) |
| *F16C 35/02* | (2006.01) |

(52) U.S. Cl.
CPC ....... *F04D 29/046* (2013.01); *F04D 13/0606* (2013.01); *F04D 13/0633* (2013.01); *F04D 13/0646* (2013.01); *F04D 29/02* (2013.01); *F04D 29/0465* (2013.01); *F04D 29/0473* (2013.01); *F04D 29/061* (2013.01);
(Continued)

(58) Field of Classification Search
CPC ............... F04D 29/046; F04D 13/0606; F04D 13/0633; F04D 13/0646; F04D 29/02; F04D 29/0465; F04D 29/0473; F04D 29/061; F04D 29/586; F04D 29/628; F04D 13/0613; F04D 29/426; F04D 1/00; F04D 7/04; F04D 15/00; F16C 33/76; F16C 35/02; F16C 2360/44; F16C 2361/63;
(Continued)

(56) References Cited

U.S. PATENT DOCUMENTS 6,309,188 B1 * 10/2001 Danner .................. H02K 7/083
417/423.12
2011/0091320 A1 * 4/2011 Laing .................. F04D 29/0467
415/229
(Continued)

FOREIGN PATENT DOCUMENTS

| CN | 109209981 A | 1/2019 |
|---|---|---|
| DE | 1528794 A1 | 3/1970 |

(Continued)

*Primary Examiner* — Dominick L Plakkoottam
(74) *Attorney, Agent, or Firm* — McGlew and Tuttle, P.C.

(57) ABSTRACT

A wet-running pump bearing retainer (29) includes a radial bearing configured for a lubrication film between an inner sliding surface (41) and a rotor shaft (13) of a pump (1). The radial bearing is fitted into a radially inner section (49) that defines an axial fluid channel (45), located at a first radial distance (D1) to a rotor axis (R) and providing a fluid flow path (F1) in a first axial flow direction. The first radial distance is larger than a radius (D0) of the inner sliding surface. A radially outer section (51) extends from the inner section and defines a second axial fluid channel (47) for a flow path (F2) in a second axial flow direction, opposite to the first flow direction. The second axial fluid channel is located at a second radial distance (D2) to the rotor axis, which is larger than the first radial distance.

21 Claims, 4 Drawing Sheets

(52) U.S. Cl.
CPC ......... *F04D 29/586* (2013.01); *F04D 29/628* (2013.01); *F16C 33/76* (2013.01); *F16C 35/02* (2013.01); *F16C 2360/44* (2013.01); *F16C 2361/63* (2013.01); *F16C 2361/65* (2013.01)

(58) Field of Classification Search
CPC .... F16C 2361/65; F16C 17/02; F16C 35/045; F16C 2226/12
See application file for complete search history.

(56) References Cited

U.S. PATENT DOCUMENTS

| | | | |
|---|---|---|---|
| 2014/0265692 A1* | 9/2014 | Schneider | ........... F04D 13/0633 310/104 |
| 2014/0377104 A1* | 12/2014 | Iversen | ................... F16C 27/02 417/423.12 |
| 2015/0051435 A1* | 2/2015 | Siess | ................... A61M 60/226 600/16 |
| 2019/0010950 A1* | 1/2019 | Lundsted Poulsen | .. F16C 35/02 |

FOREIGN PATENT DOCUMENTS

| | | | |
|---|---|---|---|
| DE | 1908237 | A1 | 9/1970 |
| DE | 2100345 | A1 | 8/1972 |
| DE | 2639541 | A1 | 3/1978 |
| DE | 19748866 | A1 | 6/1998 |
| EP | 0078345 | A1 * | 5/1983 |
| EP | 3425221 | B1 | 11/2019 |
| WO | 2008058639 | A1 | 5/2008 |
| WO | 2014180705 | A1 | 11/2014 |

* cited by examiner

PUMP BEARING RETAINER

CROSS REFERENCE TO RELATED APPLICATIONS

This application claims the benefit of priority under 35 U.S.C. § 119 of European Application 20152543.3, filed Jan. 17, 2020, the entire contents of which are incorporated herein by reference.

TECHNICAL FIELD

The present disclosure relates generally to pump bearing retainers, i.e. pump bearing retainers typically used in wet-running pumps, in particular in speed-controlled wet-running centrifugal pumps

TECHNICAL BACKGROUND

Wet-running centrifugal pumps usually comprise a rotor can separating a wet-running permanent magnet rotor from a dry stator. The rotor drives an impeller located in a pump housing. The rotor is usually mounted on a rotor shaft which is rotatable within at least one radial bearing. The radial bearing is usually circumferentially retained and centred within the pump by a pump bearing retainer, sometimes referred to as bearing plate or disc. The pump bearing retainer has a central opening into which the bearing is press-fitted in axial direction during manufacture or assembly.

Documents DE 26 39 541 A1, DE 2100 345 A1, DE 197 48 866 A1 or WO 2008/058639 A1 all describe pump bearing retainers with holes for filling the rotor chamber defined by the rotor can with fluid for providing a wet-running of the rotor.

DE 197 48 866 A1 and WO 2008/058639 A1 describe a further flow path through the hollow rotor shaft in particular to degas the rotor chamber.

EP 3 425 221 B1 describes a pump bearing retainer with an axial fluid channel being located between the inner section and the pump bearing.

All of the known pumps have persistently shown two problems. Firstly, when the pump is not running, due to temperature differences and thermal expansion of the fluid, fluid flows axially along the lubrication film between the rotor shaft and the radial bearing when the pump is not running. In other words, there is a "fluid breathing" through the lubrication film. This breathing causes precipitation and sedimentation of limescale between the rotor shaft and the radial bearing which increases the risk of blocking the rotor shaft for next pump start. Secondly, during pump operation, there is a significant fluid flow caused by significant pressure differences from the impeller chamber through the bearing retainer holes into the rotor chamber and then through the hollow rotor shaft back into the impeller chamber. This significant flow introduces magnetite, i.e. magnetic ferrous oxides in the fluid, into the rotor chamber. The magnetite is magnetically attracted by the permanent magnets of the rotor and accumulates at the rotor over time. The accumulated magnetite forms an abrasive powder that significantly increases the frictional losses in the pump and accelerates the wear of the rotor can.

SUMMARY

In contrast to known pump bearing retainers, embodiments of the present disclosure provide a pump bearing retainer which, firstly, significantly reduces the risk of pump blockage by limescale and, secondly, significantly reduces the risk of frictional losses and wear by magnetite accumulating at the rotor.

In accordance with a first aspect of the present disclosure, a pump bearing retainer for a wet-running pump is provided, wherein the pump bearing retainer comprises: a radially inner section; a radial bearing with an inner sliding surface configured to allow a lubrication film between the inner sliding surface and a rotor shaft of a pump, the radial bearing being fitted into the radially inner section; and a radially outer section extending radially outward from the inner section, wherein the radially inner section defines at least one first axial fluid channel for allowing a fluid flow in a first axial flow direction, wherein the axial fluid channel is located at a first radial distance to a rotor axis, wherein the first radial distance is larger than the radius DO of the inner sliding surface, wherein the radially outer section defines at least one second axial fluid channel for allowing a fluid flow in a second axial flow direction through the at least one second axial fluid channel, wherein the at least one second axial fluid channel is located at a second radial distance to the rotor axis, wherein the second radial distance is larger than the first radial distance, and wherein the second axial flow direction is opposite to the first axial flow direction.

In contrast to pump bearing retainers known from the prior art, the pump bearing retainer described herein allows for a circular flow out of a rotor chamber of the pump into an impeller chamber of the pump through the first axial fluid channel(s) and back from the impeller chamber into the rotor chamber through the second axial fluid channel(s). Thereby, the circular flow does not pass the rotor and less magnetite is accumulated at the rotor during pump operation, i.e. the magnetite leaves the rotor chamber before it reaches the rotor. In addition, there is less axial flow along the lubrication film between the rotor shaft and the radial bearing when the pump is not running, because the fluid follows the path of least resistance through the first and second axial fluid channel(s). The circular flow through the first axial fluid channel and the second axial fluid channel may be driven by a Tesla pump effect between a rotating impeller of the pump and the static pump bearing retainer, whereby the pressure in the impeller chamber is higher at the second axial fluid channel that at the first axial fluid channel.

Optionally, the radially inner section may comprise an inner section surface for a press-fit contact with an essentially cylinder-shaped radial outer surface of the radial bearing, wherein the shape of the inner section surface defines the at least one first axial fluid channel being located between the inner section and the radial bearing. Thereby, the first axial fluid channel(s) can be arranged as radially inward as possible without any processing of the radial bearing itself. In principle, it would be possible to arrange the first axial fluid channels in the radial bearing itself, but it would be a more complicated process, because the radial bearing is preferably ceramic. It is easier to shape the inner and outer section of the bearing retainer, which are preferably metallic.

Optionally, the radially outer section may define $n \geq 2$ second axial fluid channels distributed in an n-fold rotational symmetry. Analogously, the radially inner section may define $m \geq 2$ first axial fluid channels distributed in an m-fold rotational symmetry. Thereby, a risk of an asymmetric flow distribution can be reduced.

Optionally, the at least one first axial fluid channel may be axially offset with respect to the at least one second axial fluid channel. The term "offset" shall include a full offset or a partial offset, wherein a partial offset implies a partial overlap in axial direction between the first axial fluid channel(s) and the second axial fluid channel(s). Preferably, the offset is full, i.e. the axial offset, measured from the axial centres of the first and second axial fluid channel, respectively, is larger than half of the axial extension of the at least one first axial fluid channel.

Optionally, the total cross-sectional area A of all of the at least one first axial fluid channel(s) may be larger than 0.5 square millimetres. Thereby, the first axial fluid channel(s) is large enough to provide a flow path of significantly smaller resistance than the lubrication film between the radial bearing and the rotor shaft. For instance, the total cross-sectional area A of all of the at least one first axial fluid channel(s) may be 10 times or more larger than the cross-sectional area of the lubrication film between the radial bearing and the rotor shaft. With reference to a cross-sectional area of the lubrication film having a thickness C, the total cross-sectional area A may satisfy the formula $A \geq 20 \cdot D0 \cdot \pi \cdot C$. Thus, the flow along the lubrication film between the radial bearing and the rotor shaft causing precipitation and sedimentation of limescale is minimised.

Optionally, the total cross-sectional area B of all of the at least one second axial fluid channel(s) may be larger than 0.5 square millimetres. Analogous to the total cross-sectional area A of all of the at least one first axial fluid channel(s), it is beneficial to provide a sufficient flow through the second axial fluid channel(s). For instance, with reference to the cross-sectional area of the lubrication film having a thickness C, the total cross-sectional area B may satisfy the formula $B \geq 20 \cdot D0 \cdot \pi \cdot C$. Thus, the flow along the lubrication film between the radial bearing and the rotor shaft causing precipitation and sedimentation of limescale is minimised.

Optionally, the total cross-sectional area of all of the at least one first axial fluid channel and/or the total cross-sectional area of all of the at least one second axial fluid channel may be 10 times or more larger than the cross-sectional area of the clearance having a thickness C, i.e. $A \geq 20 \cdot D0 \cdot \pi \cdot C$ and/or $B \geq 20 \cdot D0 \cdot \pi \cdot C$. This particularly beneficial to provide an alternative flow path of low resistance for the fluid to effectively bypass the lubrication film.

Optionally, the maximal radial extension of the at least one second axial fluid channel may be below 300 microns. A larger radial extension would introduce the risk of larger particles entering the rotor chamber through the second axial fluid channel(s). A maximal radial extension of 300 microns provides for a sufficient filter effect to prevent larger particles from entering the rotor chamber. In a preferred embodiment, the radial extension of the at least one second axial fluid channel is about 250 microns.

Optionally, the number m of the at least one first axial fluid channel(s) may be larger than the number n of the at least one second axial fluid channel(s). As the second axial fluid channel(s) are arranged radially further outward, each of them may be larger than one of the first axial fluid channel(s), so that the total cross-sectional areas A and B may be in the same range. For instance, the width of each of m=6 first axial slot-shaped fluid channels and n=4 second axial fluid slot-shaped channels may be similar, e.g. about 250 microns, whereas the arc-length of the second axial fluid slot-shaped channels may be about 10 mm compared to a length of about 4 mm of the first axial slot-shaped fluid channels. Such dimensions lead to a cross-sectional area A of 6 square millimetres and a cross-sectional area B of about 10 square millimetres. In contrast to that, the clearance or lubrication film with a thickness of 13.25 microns for a rotor shaft of 10 mm diameter has a cross-sectional area below 0.5 square millimetres.

Optionally, each of the at least one second axial fluid channel(s) may be formed as an arc-shaped slot having an arc radius essentially equal to the second radial distance. This is advantageous to achieve a certain cross-sectional area per each second axial fluid channel while staying within a maximal radial extension for filtering larger particles. The radial extension corresponds to the width of the slot(s).

Optionally, each arc-shaped slot may extend over 0.05 to 0.5 radians. This corresponds to the length of the slot(s). The lower limit of preferably 0.05 radians has shown to achieve a sufficient cross-sectional area per each second axial fluid channel. The upper limit of preferably 0.5 radians may depend on the number n of slots and the limits of structural integrity of the pump bearing retainer.

Optionally, the inner section surface may comprise at least one first portion and at least one second portion in circumferential direction, wherein the at least one first portion has a first radius and the at least one second portion has a second radius being larger than the first radius, such that the at least first portion defines at least one contact portion for a press-fit with an essentially cylinder-shaped radial outer surface of a radial bearing, and such that the at least one second portion defines the at least one first axial fluid channel being located between the inner section and the radial bearing. Such a "wavy" and/or "crenelated" shape of the inner section surface is a very convenient and efficient way to define the first axial fluid channel(s).

In accordance with a second aspect of the present disclosure, a pump is provided comprising a previously described pump bearing retainer, wherein the pump is a wet-running centrifugal pump comprising: a permanent-magnet synchronous motor (PMSM); a rotor shaft being arranged in the radial bearing of the pump bearing retainer with a clearance to the inner sliding surface of the radial bearing for establishing a lubrication film; and an impeller being mounted to the rotor shaft.

If there is a significant flow along the permanent-magnets within the rotor of the motor, Fe++-ions dissolved in the fluid fall out at the rotor as magnetite ($Fe_3O_4$) which accumulates in form of an abrasive powder at the rotor, because it is magnetically attracted by the permanent-magnets. This abrasive powder grinds at the rotor can and increases the frictional losses and the wear of the rotor can. The pump described herein prevents a flow along the permanent-magnets within the rotor of the motor on the one hand and avoids an accumulation of limescale at the inner sliding surface of the radial bearing on the other hand.

Optionally, the axial distance of the impeller to the outer section of the pump bearing retainer, measured at the outer radius of the impeller, is below 2.0 millimetres, preferably below 1.5 millimetres. Such a small distance facilitates the Tesla pump effect for driving the circular flow through the first and second axial fluid channel(s).

Optionally, the outer radius of the impeller is smaller than the second radial distance of the at least one second axial fluid channel to the rotor axis. Thereby, a maximal pressure difference between the first and second axial fluid channel(s) is reached to drive the circular flow through the first and second axial fluid channel(s) most effectively.

Optionally, the total cross-sectional area of all of the at least one first axial fluid channel and/or the total cross-sectional area of all of the at least one second axial fluid channel may be 10 times or more larger than the cross-sectional area of the clearance. This particularly beneficial to provide an alternative flow path of low resistance for the fluid to effectively bypass the lubrication film in the clearance.

Optionally, the pump may comprise a rotor can, wherein the pump bearing retainer is located axially between the rotor can and the impeller, wherein the rotor can and the pump bearing retainer define the outer boundaries of a rotor chamber, wherein the axial distance of the rotor can to the at least one second axial fluid channel in the radially outer section of the pump bearing retainer is larger than the axial distance of the impeller to the outer section of the pump bearing retainer, measured at the outer radius of the impeller. This provides for a sufficiently large flow path in the rotor chamber between the rotor can and the pump bearing retainer.

In accordance with a third aspect of the present disclosure, a method of operating a wet-running centrifugal pump comprising a permanent-magnet synchronous motor (PMSM) is provided, wherein the method comprises the steps of:

providing, when the motor is running, a first flow path from a rotor chamber into an impeller chamber through at least one first axial fluid channel defined by a radially inner section of a pump bearing retainer of the pump, and providing, when the motor is running, a second flow path from the impeller chamber into the rotor chamber through at least one second axial fluid channel defined by a radially outer section of the pump bearing retainer.

Optionally, a circular flow from the rotor chamber into the impeller chamber along the first flow path and from the impeller chamber back into the rotor chamber along the second flow path may be driven by a Tesla pump effect between the impeller and the pump bearing retainer when the motor is running.

Optionally, the method may further comprise the steps:

providing, when the motor is stopped, a third flow path from the rotor chamber into the impeller chamber through an inner rotor shaft channel extending between a second axial shaft end and a first axial shaft end, wherein the first axial shaft end is located within the impeller chamber and the second axial shaft end is located in the rotor chamber, and providing, when the motor is stopped, a fourth flow path from the impeller chamber into the rotor chamber through the at least one first axial fluid channel.

Embodiments of the present disclosure will now be described byway of example with reference to the following figures The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3b is a cut view of the pump bearing retainer along the plane C-C as shown in FIG. 3a;

DESCRIPTION OF PREFERRED EMBODIMENTS

Figure 1:
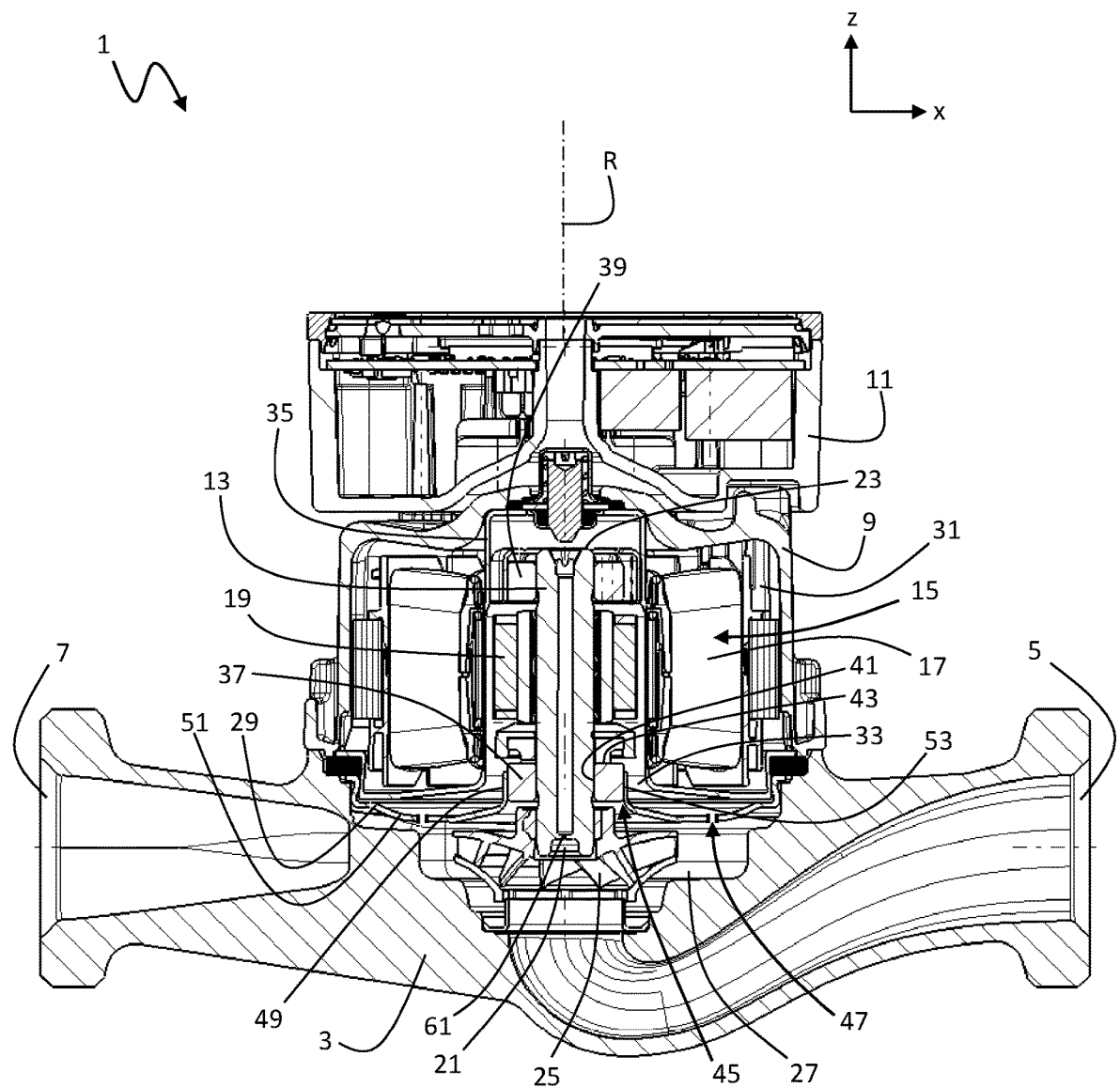
FIG. 1 is a longitudinal cut view of an embodiment of a pump according to the present disclosure.

Referring to the drawings, FIG. 1 shows a wet-running centrifugal pump 1 that is typically used to circulate water in household heating systems. The pump 1 comprises a pump housing 3 having a suction inlet 5 and a pressure outlet 7. The section inlet 5 and the pressure outlet 7 are essentially coaxially aligned along an axis x. The pump 1 further comprises a motor housing 9 and an electronics housing 11. The motor housing 9 and the electronics housing 11 are essentially coaxially aligned along an axis z, which extends perpendicular to the x-axis. The motor housing 9 is fixed to the pump housing 3 and the electronics housing 11 is fixed to the motor housing 9. The pump 1 further comprises a rotor shaft 13 extending along the x-axis and defining a rotor axis R extending along the z-axis. The motor housing 9 encloses a permanent magnet synchronous motor (PMSM) 15 comprising a stator 17 and a rotor 19. The rotor 19 is fixed to the rotor shaft 13 and rotatable about the rotor axis R. The electronics housing 11 comprises electronics for controlling the motor 15.

The rotor shaft 13 comprises a first axial shaft end 21 protruding outside of the motor housing 9 and a second axial shaft end 23 located within the motor housing 9. An impeller 25 is mounted to the first axial shaft end 21 and arranged within an impeller chamber 27 formed by the pump housing 3. A boundary of the impeller chamber 27 towards the motor housing 9 is defined by a pump bearing retainer 29.

The motor housing 9 comprises a dry region 31 and a wet region in form of a rotor chamber 33. The stator 17 of the motor 15 is located within the dry region 31, whereas the rotor 19 and the rotor shaft 13 are located within the wet region, i.e. the rotor chamber 33. The rotor chamber 33 is separated from the dry region 31 by a rotor can 35.

The rotor shaft 13 is axially aligned by two radial bearings, i.e. a first radial bearing 37 and a second radial bearing 39. The first radial bearing 37 is retained by the pump bearing retainer 29 and located close to the impeller 25. The second radial bearing 39 is located close to the second axial shaft end 23. The rotor 19 is arranged between the first radial bearing 37 and the second radial bearing 39. The first radial bearing 37 comprises an inner sliding surface 41 with a clearance to the rotor shaft 13 to establish a low-friction lubrication film between the inner sliding surface 41 and the rotor shaft 13. Analogously, the second radial bearing comprises an inner sliding surface. The first radial bearing further comprises an annular sliding surface 43 facing away from the pump housing 3. Thereby, the first radial bearing 37 also serves as an axial bearing for the rotating parts of the pump 1.

It should be noted that there is a clearance of less than 20 microns between the outer diameter of the rotor shaft 13 and the inner sliding surface 41 of the radial bearing 37. Such a clearance provides for a lubrication film established by the fluid to be pumped to reduce the frictional losses in the pump 1. The total cross-sectional area of the lubrication film may be below 0.5 mm$^2$. A fluid flow along the lubrication film is not desirable, in particular when the pump is not running, because such a flow causes precipitation and sedimentation of lime-scale between the rotor shaft 13 and the first radial bearing 37, which increases the risk of blocking the rotor shaft 13 for next pump start.

Figure 2:
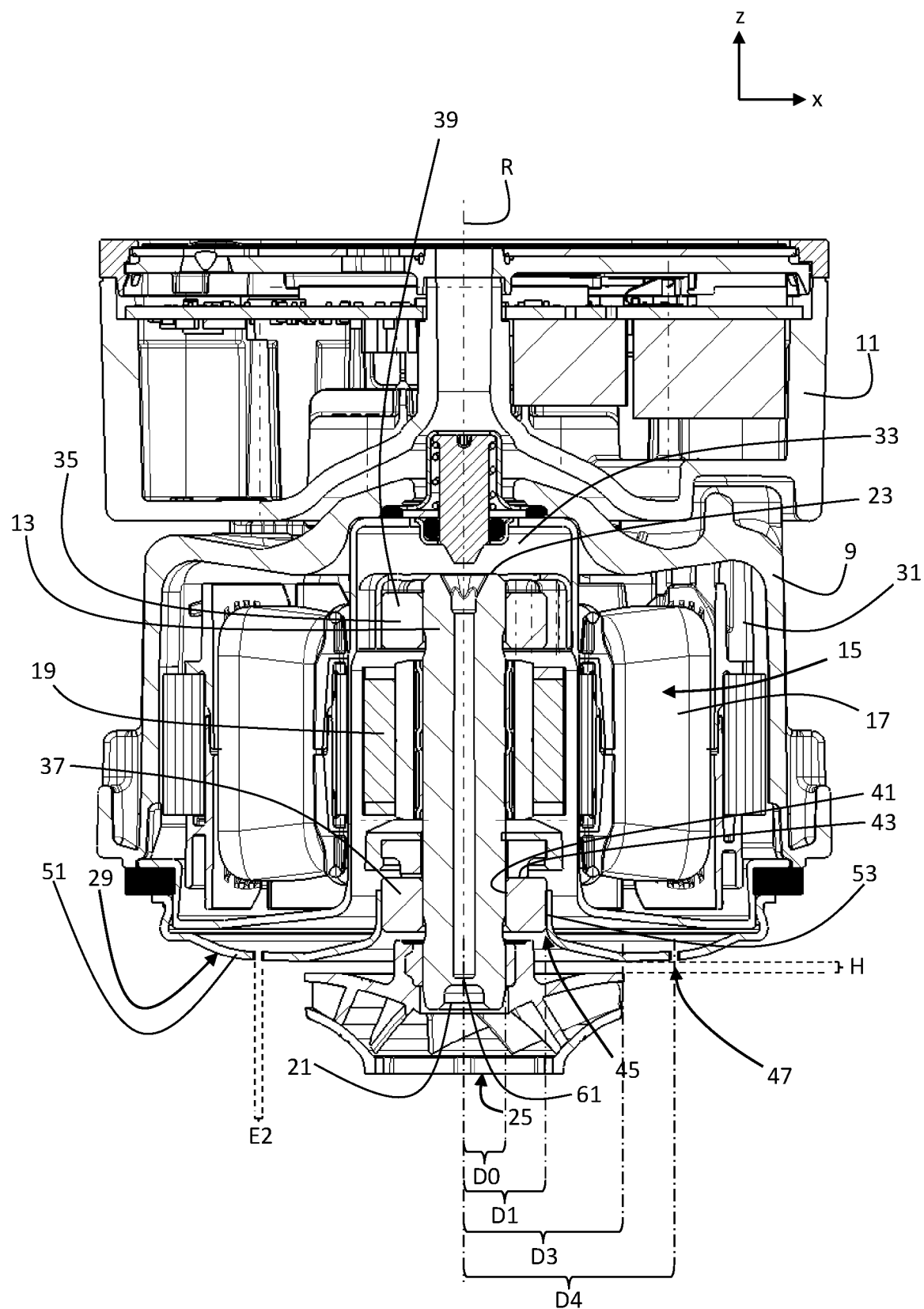
FIG. 2 is a longitudinal cut view of the pump as shown in FIG. 1 without the pump housing.

In order to reduce the risk of fluid flow along the lubrication film, the pump bearing retainer 29 defines specific alternative axial fluid channels 45, 47 that serve as a bypass or shunt. The pump bearing retainer 29 comprises a radially inner section 49 into which the first radial bearing 37 is press-fitted. Furthermore, the pump bearing retainer 29 comprises a radially outer section 51 extending radially outward from the inner section 49. The radially inner section 49 defines first axial fluid channels 45 where it contacts the first radial bearing 37. As shown in FIG. 2, this means that the first axial fluid channels 45 are located at a first radial distance D1 to the rotor axis R, wherein the first radial distance D1 essentially corresponds to the outer radius of the first radial bearing 37. It is important to note that the first radial distance D1 is larger than the radius D0 of the inner sliding surface 41 of the first radial bearing 37. The radially outer section 51 of the pump bearing retainer 29 defines second axial fluid channels 47 in form of slots. The second axial fluid channels 47 are located at a second radial distance D2 to the rotor axis R, wherein the second radial distance D2 is larger than the first radial distance D1. It should be noted that the outer radius D3 of the impeller 25 is larger than the first radial distance D1, but smaller than the second radial distance D2, i.e. D0<D1<D3<D2.

Figure 4A:
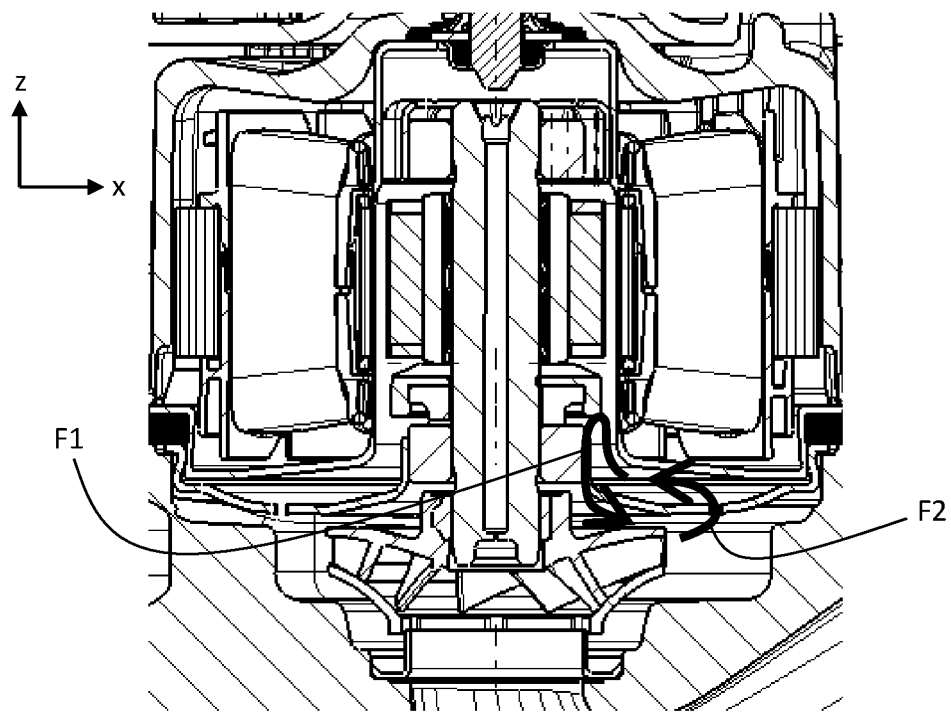
FIG. 4a is a longitudinal cut view of the pump as shown in FIG. 1 with arrows indicating flow paths during operation of the pump.

As shown in FIG. 2, there is an axial distance H of less than 2.0 mm, preferably 1.5 mm, between the impeller 25 and the radially outer section 51 of the pump bearing retainer 29, measured at the outer radius D3 of the impeller 25. Such a small axial distance H is particularly useful to provide a Tesla pump effect between the impeller 25 and the pump bearing retainer 29, so that there is a lower pressure at the first axial fluid channels 45 than at the second axial fluid channels 47. This pressure differential drives a circular flow as shown in FIG. 4*a* when the pump is running. The flow direction through the second axial fluid channel 47 from the impeller chamber 27 into the rotor chamber 33 is opposite to the flow direction through the first axial fluid channel 45 from the rotor chamber 33 into the impeller chamber 27. This circular flow is particularly beneficial to reduce the risk of magnetite accumulation at the rotor 19, because the magnetite leaves the rotor chamber 33 through the first axial fluid channels 45 before it reaches the rotor 19.

Figure 3A:
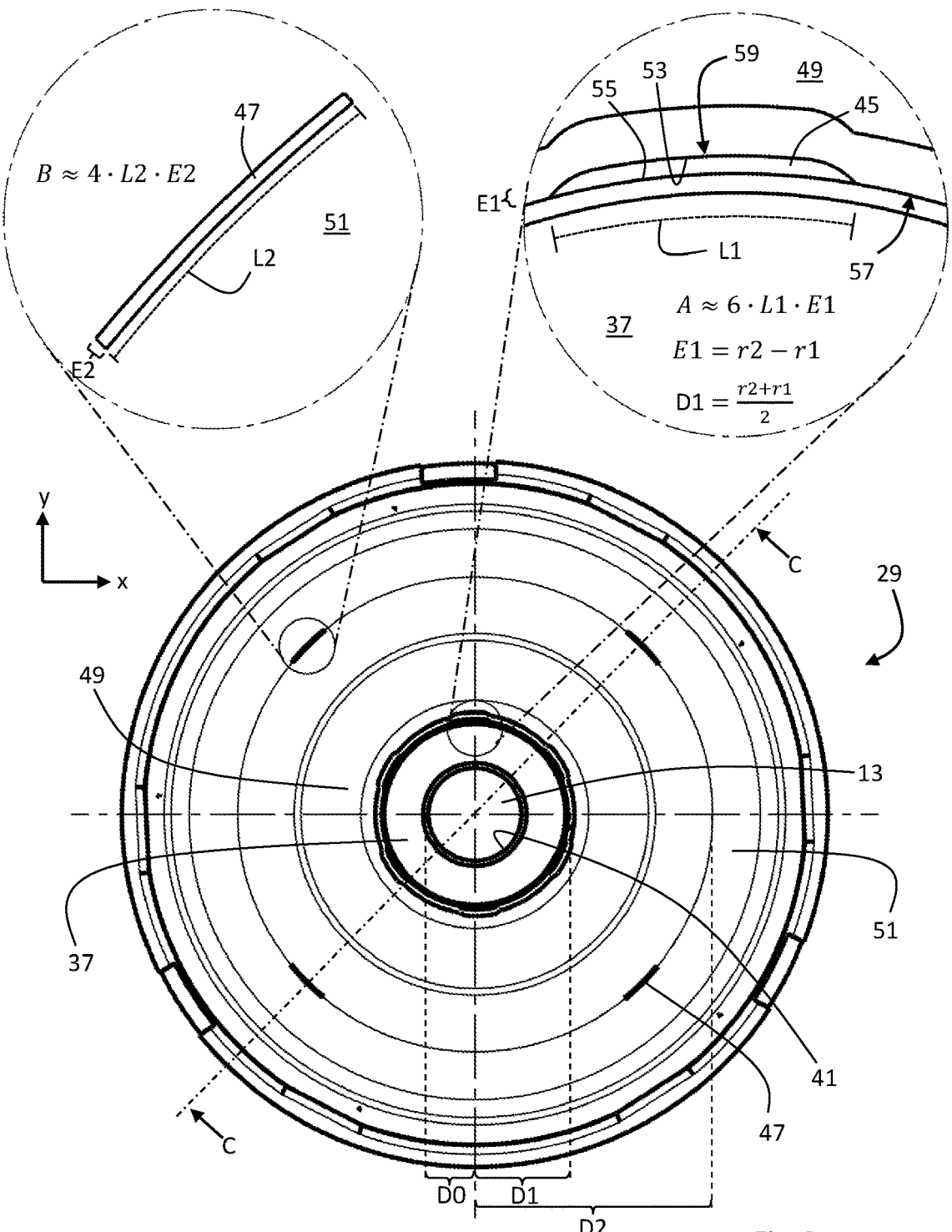
FIG. 3a is a top view of an embodiment of a pump bearing retainer according to the present disclosure with detail views of a first axial channel and second axial channel.
Figure 3B:
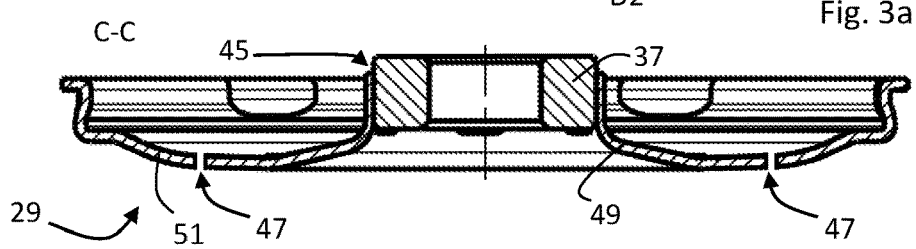

FIG. 3*a* shows the pump bearing retainer 29 in more detail. It can be seen that the radially inner section 49 of the pump bearing retainer 29 is "crenelated" in radial direction forming six "crenels" in the contact area with the first radial bearing 37. The crenels each form a first axial fluid channel 45 between the radially inner section 49 and the first radial bearing 37. In other words, the radially inner section 49 comprises an inner section surface 53 for a press-fit contact with an essentially cylinder-shaped radial outer surface 55 of the first radial bearing 37. The shape of the inner section surface 53 defines the first axial fluid channels 45 being located between the inner section 49 and the first radial bearing 37. The inner section surface 53 comprises six first portions 57 and six second portions 59 in circumferential direction. The first portions 57 have a first radius r1 and the second portions 59 have a second radius r2 being larger that than the first radius r1, i.e. r1<r2, such that the first portions 57 define contact portions for a press-fit with the essentially cylinder-shaped radial outer surface 55 of the first radial bearing 37, and such that the second portions 59 define the first axial fluid channels 45. The first portions 57 and the second portions 59 are evenly distributed in circumferential direction in a six-fold rotational symmetry. The first axial fluid channels 45 are formed as arc-shaped slots with a width, i.e. r2−r1, of less than 300 microns and an arc length L1 of more than 0.1 radians.

The total cross-sectional area A of the m=6 first axial fluid channels 45 can be approximated by A≈m·L1·E1, whereas the total cross-sectional area B of the n=4 second axial fluid channels 47 can be approximated by B≈n·L2·E2. The total cross-sectional areas A and B are each a factor of 10 or more larger than the total cross-sectional area of the lubrication film between the radial bearing 37 and the rotor shaft 13. Thereby, an axial flow along the lubrication film is significantly minimized.

The four second axial fluid channels 47 are formed as arc-shaped slots cut into the radially outer section 51 of the pump bearing retainer 29, wherein the slots have an arc radius essentially equal to the second radial distance D2 between the second axial fluid channels 47 and the rotor axis R. Analogous to the first axial fluid channels 45, the width of the second axial fluid channels 47, i.e. their maximal radial extension E2, is below 3000 microns. This is particularly beneficial to prevent larger particles from entering the rotor chamber 33 through the second axial fluid channels 47. The arc length L2 of the second axial fluid channels 47 may extend over 0.05 to 0.5 radians. Analogous to the first axial fluid channels 45, the four second axial fluid channels 47 are evenly distributed in a four-fold rotational symmetry with respect to the rotor axis R.

The method according to the present disclosure is described in FIGS. 4*a,b*, wherein FIG. 4*a* shows the predominant circular flow when the pump 1 is running. This circular flow is driven by a Tesla pump effect between the impeller 25 and the pump bearing retainer 29 having a small axial distance H of less than 2.0 mm to each other. The circular flow comprises a first flow path F1 in a first axial flow direction from the rotor chamber 33 into the impeller 29 through the first axial fluid channels 45. Furthermore, the circular flow comprises a second flow path F2 in a second axial flow direction opposite to the first axial flow direction from the impeller chamber 27 through the second axial fluid channels 47 into the rotor chamber 33.

Figure 4B:
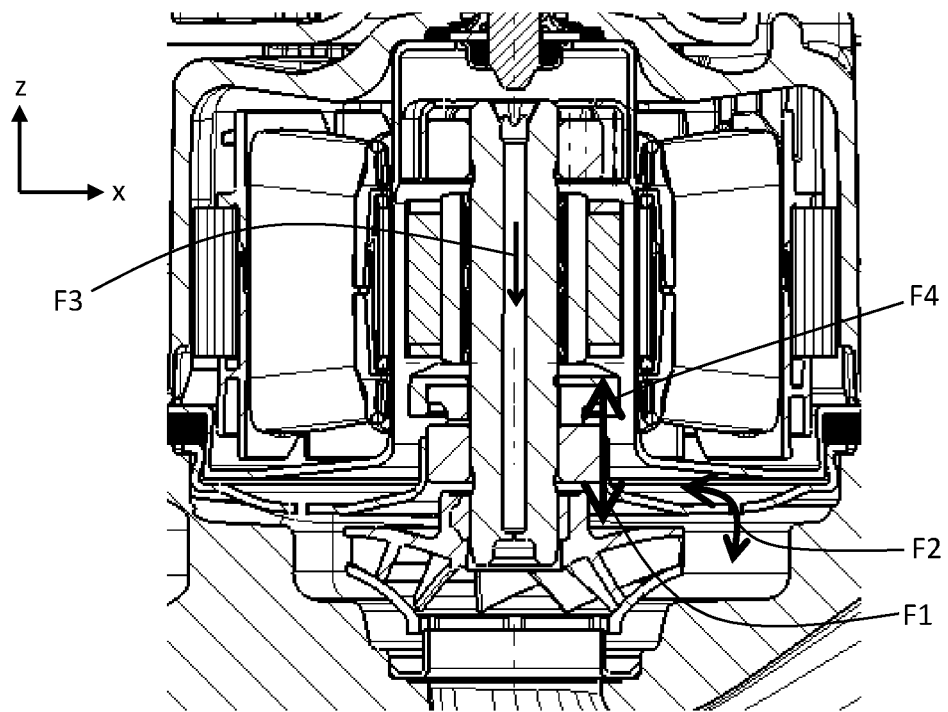
FIG. 4b is a longitudinal cut view of the pump as shown in FIG. 1 with arrows indicating flow paths during when the pump is not running.

It should be noted that the rotor shaft 13 is in this example hollow to define a third flow path F3 from the second axial shaft end 23 to the first axial shaft end 21, i.e. from the rotor chamber 33 into the impeller chamber 27. The third flow path F3 is not part of the circular flow shown in FIG. 4*a*, when the pump is running, but used to degas the rotor chamber 33 when the pump is stopped as shown in FIG. 4*b*. In fact, a flow along the third flow path F3 during pump operation should be minimized as much as possible, because such a flow reduces the pump efficiency. Therefore, the third flow path F3 has a very narrow bottle neck 61 at the first axial shaft end 21 with a very small opening of less than 0.05 mm2 into the impeller chamber 27. This is sufficient to degas the rotor chamber 33. However, due to the low pressure at the centre of the impeller 25, a significant flow along the third flow path F3 is a problem of the prior art, where it transports magnetite into the rotor chamber 33, so that it accumulates at the rotor 19 and increases frictional losses and wear of the rotor can 35. The circular flow with the first flow path F1 and the second flow path F2 through the first axial flow channels 45 and the second axial flow channels 47, respectively, significantly reduces the flow along the third flow path F3 when the pump is operating. In fact, the third flow path F3 is not needed anymore at all for the pump according the present disclosure, because the rotor chamber 33 may degas via the first fluid channels 45 and the second fluid channels 47.

When the pump is stopped, as shown in FIG. 4b, there may be a "breathing" flow due to thermal expansion of the fluid via the first flow path F1 and/or the second flow path F2 through the first fluid channels 45 and/or the second fluid channels 47, respectively. Such a "breathing" flow may, for instance, be driven by fluid temperature differences between the two axial shaft ends 21, 23. The fluid in the impeller chamber 27 may have a different temperature compared to the fluid at the second axial shaft end 23, so that fluid flows from the rotor chamber 33 into the impeller chamber 27 and back. The first axial fluid channels 45 provide the first flow path F1 and/or a fourth flow path F4 from the impeller chamber 27 into the rotor chamber 33, i.e. in an opposite direction compared to the first flow path F1 when the pump is running. Thereby, both the flow along the lubrication film between the first radial bearing 37 and the rotor shaft 13 as well as the flow along the third flow path F3 is minimised, because the alternative flow paths F1, F4 and/or F2 provide a flow path of less resistance. Thus, the risk of rotor shaft blockage due to precipitation and sedimentation of limescale in the lubrication film during a long period of non-operating the pump, e.g. in summer periods when no heating is needed, is significantly reduced. Furthermore, the rotor chamber 33 can be degassed via the flow paths F1, F2 and/or F2.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE CHARACTERS 1 pump
3 pump housing
5 suction inlet
7 pressure outlet
9 motor housing
11 electronics housing
13 rotor shaft
15 motor
17 stator
19 rotor
21 first axial shaft end
23 second axial shaft end
25 impeller
27 impeller chamber
29 pump bearing retainer
31 dry region of motor housing
33 rotor chamber
35 rotor can
37 first radial bearing
39 second radial bearing
41 inner sliding surface of first radial bearing
43 annular sliding surface of first radial bearing
45 first axial fluid channel(s)
47 second axial fluid channel(s)
49 radially inner section of pump bearing retainer
51 radially outer section of pump bearing retainer
53 inner section surface
55 radial outer surface of first radial bearing
57 first portions
59 second portions
61 bottle neck
R rotor axis
H axial distance
E1 maximal radial extension of the first axial fluid channels
E2 maximal radial extension of the second axial fluid channels
D0 inner radius of first radial bearing
D1 first radial distance
D2 second radial distance
D3 outer radius of impeller
F1 first flow path
F2 second flow path
F3 third flow path
F4 fourth flow path
r1 first radius
r2 second radius
L1 arc length of first axial fluid channels
L2 arc length of second axial fluid channels
A total cross-sectional area of the first axial fluid channels
B total cross-sectional area of the second axial fluid channels
m number of first axial fluid channels
n number of second axial fluid channels

What is claimed is:

1. A pump bearing retainer for a wet-running pump with a rotor shaft, the pump bearing retainer comprising:
   a radially inner section;
   a radial bearing with an inner sliding surface configured to allow a lubrication film between the inner sliding surface and the rotor shaft of the pump, the radial bearing being fitted into the radially inner section; and
   a radially outer section extending radially outward from the inner section, wherein:
      the radially inner section defines at least one first axial fluid channel providing a first fluid flow path in a first axial flow direction;
      the at least one first axial fluid channel is located at a first radial distance to a rotor axis;
      the first radial distance is larger than the radius of the inner sliding surface;
      the radially outer section defines at least one second axial fluid channel providing a fluid flow path in a second axial flow direction through the at least one second axial fluid channel;
      the at least one second axial fluid channel is located at a second radial distance to the rotor axis;
      the second radial distance is larger than the first radial distance;
      the second axial flow direction is opposite to the first axial flow direction; and
      the at least one second axial fluid channel is formed as an arc-shaped slot having an arc radius equal to the second radial distance.

2. The pump bearing retainer according to claim 1, wherein:
   the radially inner section comprises an inner section surface for a press-fit contact with an essentially cylinder-shaped radial outer surface of the radial bearing; and
   a shape of the inner section surface defines the at least one first axial fluid channel that is located between the inner section and the radial bearing.

3. The pump bearing retainer according to claim 1, wherein the radially outer section defines n≥2 second axial fluid channels distributed in an n-fold rotational symmetry.

4. The pump bearing retainer according to claim 1, wherein the at least one first axial fluid channel is axially offset with respect to the at least one second axial fluid channel.

5. The pump bearing retainer according to claim 1, wherein:
   the at least one first axial fluid channel has a total cross-sectional area that is at least ten times larger than a cross-sectional area of the lubrication film; or
   the at least one second axial fluid channel has a total cross-sectional area that is at least ten times larger than a cross-sectional area of the lubrication film; or
   the at least one first axial fluid channel has a total cross-sectional area that is at least ten times larger than a cross-sectional area of the lubrication film and the at least one second axial fluid channel has a total cross-sectional area that is at least ten times larger than a cross-sectional area of the lubrication film.

6. The pump bearing retainer according to claim 1, wherein the at least one first axial fluid channel has a total cross-sectional area that is larger than 0.5 square millimeters.

7. The pump bearing retainer according to claim 1, wherein the at least one second axial fluid channel has a total cross-sectional area that is larger than 0.5 square millimeters.

8. The pump bearing retainer according to claim 1, wherein a maximal radial extension of the at least one second axial fluid channel is below 300 microns.

9. The pump bearing retainer according to claim 1, wherein:
   the at least one first axial fluid channel comprises m number of fluid channels;
   the at least one second axial fluid channel comprises n number of fluid channels; and
   m>n.

10. The pump bearing retainer according to claim 1, wherein each arc-shaped slot extends over 0.05 to 0.5 radians.

11. The pump bearing retainer according to claim 1, wherein:
   the inner section surface comprises at least one first portion and at least one second portion in a circumferential direction;
   the at least one first portion has a first radius;
   the at least one second portion has a second radius that is larger than the first radius, such that the at least first portion defines at least one contact portion for a press-fit with an essentially cylinder-shaped radial outer surface of the radial bearing and such that the at least one second portion defines the at least one first axial fluid channel located between the inner section and the radial bearing.

12. The pump bearing retainer according to claim 1, wherein the radial bearing or the inner sliding surface comprise a ceramic.

13. The pump bearing retainer according to claim 1, wherein the radially outer section defines at least another second axial fluid channel providing another fluid flow path in the second axial flow direction through the at least another second axial fluid channel, the at least another second axial fluid channel being formed as an another arc-shaped slot having an another arc radius equal to the second radial distance, the at least another second axial fluid channel being located at a spaced location from the at least one second axial fluid channel in a circumferential direction with respect to a longitudinal axis of the rotor shaft of the pump.

14. A wet-running centrifugal pump comprising:
   a permanent-magnet synchronous motor;
   a rotor shaft;
   an impeller mounted to the rotor shaft; and
   a pump bearing retainer comprising:
      a radially inner section;
      a radial bearing fitted into the radially inner section, the rotor shaft being arranged in the radial bearing with a clearance to an inner sliding surface of the radial bearing for establishing a lubrication film; and
      a radially outer section extending radially outward from the inner section, wherein:
         the radially inner section defines at least one first axial fluid channel providing a first fluid flow path in a first axial flow direction;
         the at least one first axial fluid channel is located at a first radial distance to a rotor axis;
         the first radial distance is larger than the radius of the inner sliding surface;
         the radially outer section defines at least one second axial fluid channel providing a fluid flow path in a second axial flow direction through the at least one second axial fluid channel;

the at least one second axial fluid channel is located at a second radial distance to the rotor axis;

the second radial distance is larger than the first radial distance;

the second axial flow direction is opposite to the first axial flow direction; and the at least one second axial fluid channel is formed as an arc-shaped slot having an arc radius equal to the second radial distance.

15. The pump according to claim 14, wherein an axial distance of the impeller to the radially outer section of the pump bearing retainer, measured at an outer radius of the impeller is below 2.0 millimeters.

16. The pump according to claim 14, wherein an outer radius of the impeller is smaller than the second radial distance of the at least one second axial fluid channel to the rotor axis.

17. The pump according to claim 14, wherein:

the at least one first axial fluid channel has a total cross-sectional area that is at least ten times larger than a cross-sectional area of the lubrication film; or the at least one second axial fluid channel has a total cross-sectional area that is at least ten times larger than a cross-sectional area of the lubrication film; or the at least one first axial fluid channel has a total cross-sectional area that is at least ten times larger than a cross-sectional area of the lubrication film and the at least one second axial fluid channel has a total cross-sectional area that is at least ten times larger than a cross-sectional area of the lubrication film.

18. The pump according to claim 14, further comprising a rotor can, wherein:

the pump bearing retainer is located axially between the rotor can and the impeller;

the rotor can and the pump bearing retainer define the outer boundaries of a rotor chamber;

an axial distance of the rotor can to the at least one second axial fluid channel in the radially outer section of the pump bearing retainer is larger than the axial distance of the impeller to the radially outer section of the pump bearing retainer, measured at an outer radius of the impeller.

19. A method of operating a wet-running centrifugal pump comprising a permanent-magnet synchronous motor, the method comprising:

providing, when the motor is running, a first flow path from a rotor chamber into an impeller chamber through at least one first axial fluid channel defined by a radially inner section of a pump bearing retainer of the pump, the at least one first axial fluid channel being located at a first radial distance to a rotor axis; and providing, when the motor is running, a second flow path from the impeller chamber into the rotor chamber through at least one second axial fluid channel defined by a radially outer section of the pump bearing retainer, the at least one second axial fluid channel being located at a second radial distance to the rotor axis, wherein the at least one second axial fluid channel is formed as an arc-shaped slot having an arc radius equal to the second radial distance.

20. The method according to claim 19, wherein a circular flow from the rotor chamber into the impeller chamber along the first flow path and from the impeller chamber back into the rotor chamber along the second flow path is driven by a Tesla pump effect between the impeller and the pump bearing retainer when the motor is running.

21. The method according to claim 19, further comprising:

providing, when the motor is stopped, a third flow path from the rotor chamber into the impeller chamber through an inner rotor shaft channel extending between a second axial shaft end and a first axial shaft end, wherein the second axial shaft end is located within the rotor chamber and the first axial shaft end is located in the impeller chamber; and providing, when the motor is stopped, a fourth flow path from the impeller chamber into the rotor chamber through the at least one first axial fluid channel.

* * * * *